United States Patent [19]

Joichi

[11] Patent Number: 4,922,513
[45] Date of Patent: May 1, 1990

[54] ROTATION CONTROL CIRCUIT FOR A HALL MOTOR

[75] Inventor: Yoshiro Joichi, Tokyo, Japan

[73] Assignee: Sony Corporation, Tokyo, Japan

[21] Appl. No.: 410,983

[22] Filed: Sep. 22, 1989

[30] Foreign Application Priority Data

Sep. 29, 1988 [JP] Japan .................................. 63-242282

[51] Int. Cl.⁵ .............................................. H02P 6/02
[52] U.S. Cl. .................................... 318/254; 318/603; 318/714; 310/DIG. 3
[58] Field of Search ................ 318/254, 700, 712–714, 318/720–721, 136–138, 439, 600–603; 310/68 R, 68 B, 181, 184, DIG. 3

[56] References Cited

U.S. PATENT DOCUMENTS

| | | | |
|---|---|---|---|
| 3,946,292 | 3/1976 | Tanikashi | 318/254 |
| 4,356,437 | 10/1982 | Saito et al. | 318/254 |
| 4,363,984 | 12/1982 | Torii et al. | 310/156 |
| 4,376,914 | 3/1983 | Kimura | 318/603 |
| 4,511,828 | 4/1985 | Wada | 318/254 |
| 4,626,752 | 12/1986 | Fujisaka | 310/68 R X |
| 4,668,884 | 5/1987 | Amao et al. | 318/254 X |
| 4,710,683 | 12/1987 | Bahn et al. | 318/254 |

Primary Examiner—William M. Shoop, Jr.
Assistant Examiner—David Martin
Attorney, Agent, or Firm—Philip M. Shaw, Jr.

[57] ABSTRACT

A rotation control circuit for a Hall motor of reduced-size and suppressed irregular rotation and having a controller that stores in a memory circuit data indicative of an irregular magnetization of a rotor magnet derived from a change of the magnetic field of the rotor magnet detected by a Hall element as an irregular rotation informationsignal, in which the irregular rotation information signal is input to a speed servo loop of the Hall motor, whereby the change of magnetic field of the rotor magnet is used as an FG signal to form a speed servo circuit.

5 Claims, 4 Drawing Sheets

ROTATION CONTROL CIRCUIT FOR A HALL MOTOR

BACKGROUND OF THE INVENTION

1. Field of the Invention

The present invention relates generally to rotation control circuits and, more particularly, is directed to a rotation control circuit for a Hall motor in which a rotor magnet is opposed to a plurality of stator coils and a change of magnetic field of the rotor magnet is detected by a Hall element, thereby controlling a drive signal supplied to the stator coils.

2. Description of the Prior Art

A Hall motor in which the rotational magnetic field is detected by a Hall element to control the current phase of the drive coil is generally formed as a flat brush and slotless (BSL) motor, and this type of Hall motor is useful as the power source for electronic equipment.

FIG. 1 shows an example of such a known Hall motor.

It will be seen in FIG. 1 that the Hall motor is comprised of a circular rotor magnet 1 on which north (N) poles and south (S) poles are alternately magnetized in the circumferential direction thereof, a plurality of stator coils 2a, 2b, 2c, . . . 2f opposed to the rotor magnet 1 with a predetermined clearance to generate repulsive and/or attractive magnetic fields and a plurality of Hall elements 3a, 3b and 3c located on the stator side with a predetermined spacing therebetween to detect the rotational magnetic field of the rotor magnet 1 when the rotor magnet 1 is rotated by drive magnetic fields of the stator coils 2a, 2b, . . . .

When the phase of the drive current i, supplied to each of the stator coils 2a, 2b, . . . 2f, is controlled on the basis of the phase information detected by the Hall elements 3a, 3b and 3c, the rotor magnet 1 rotates at a constant speed, rotating an optical disk through, for example, a turntable or the like which is rotatable together with the rotor magnet 1.

The optical disk, on which various kinds of signals are recorded, is rotated by the above-mentioned Hall motor or the like. In this case, if the N and S poles are irregularly magnetized on the rotor magnet 1 or if the rotor magnet is irregularly magnetized, then this leads to irregular torque of the motor so that the optical disk can not rotate regularly.

In order to solve the above-mentioned problem in the BSL motor, it is proposed to additionally provide a servo circuit which utilizes an electromotive voltage of the Hall element provided at the stator side as an FG signal, and in which the irregular rotation of the motor can be suppressed by the FG signal.

In such a servo circuit, the irregular magnetization of the rotor magnet causes a large error signal to be generated, which saturates the servo circuit (motor drive circuit). Further, when the loop gain of a servo circuit is increased to improve the response characteristic, there is then presented the problem that the servo characteristic becomes unstable.

Furthermore, in the case of the afore-noted Hall motor, the magnetic fields generated from the stator coils 2a, 2b, 2c, . . . 2f should differentially cancel each other out on the Hall elements 3a, 3b and 3c, and they should therefore not be generated as the detected signal. In practice, however, a voltage is induced by the magnetic field produced by the coils of the stator side, causing the high gain servo system to operate unstably.

OBJECTS AND SUMMARY OF THE INVENTION

Accordingly, it is an object of the present invention to provide an improved rotation control circuit for a Hall motor which can eliminate the above-mentioned defects encountered with the prior art.

More specifically, another object of the present invention is to provide a rotation control circuit for a Hall motor in which a detecting signal corresponding to the rotary magnetic field of the rotor magnet and detected by a Hall element is supplied to a counter, an irregular rotation information signal is computed on the basis of the count derived from the counter, and the irregular rotation information signal for at least one revolution is stored. The stored irregular rotation information signal is supplied in synchronism with the rotary phase of the rotor magnet to a speed servo circuit, forming a servo system which controls the speed and, which suppresses irregular rotation.

According to an aspect of the present invention, there is provided a rotation control circuit for a Hall motor of the type having a rotor magnet, a plurality of stator coils, and a Hall element which is positioned for detecting changes of the magnetic field of the rotor magnet which is rotated in an opposing relation to the plurality of stator coils, wherein the control circuit comprises:

(a) a motor drive circuit for supplying a drive current to the plurality of stator coils;

(b) comparing means for comparing the signal detected by the Hall element with a predetermined level;

(d) counter means for receiving and counting a reference clock signal from an external source and which is reset in response to an output from the comparing means;

(e) computing means for computing irregular rotation data information from the count value derived from the counter means corresponding to at least one revolution of the rotor magnet;

(f) memory means for storing the irregular rotation data information obtained by the computing means; and (g) control means for supplying the irregular rotation data stored in the memory means to the motor drive circuit in synchronism with the rotational phase of the rotor magnet, wherein the drive current supplied from the motor drive circuit to the plurality of stator coils is controlled by the irregular rotation information signal sequentially derived from the control circuit to thereby reduce irregular rotation of the rotor magnet.

These and other objects, features and advantages of the present invention will become apparent in the following detailed description of a preferred embodiment when read in conjunction with the accompanying drawings, in which like reference numerals are used to identify the same or similar parts in the several views.

DETAILED DESCRIPTION OF A PREFERRED EMBODIMENT

A rotation control circuit for a Hall motor according to an embodiment of the present invention will now be described with reference to the drawings.

Figure 2:
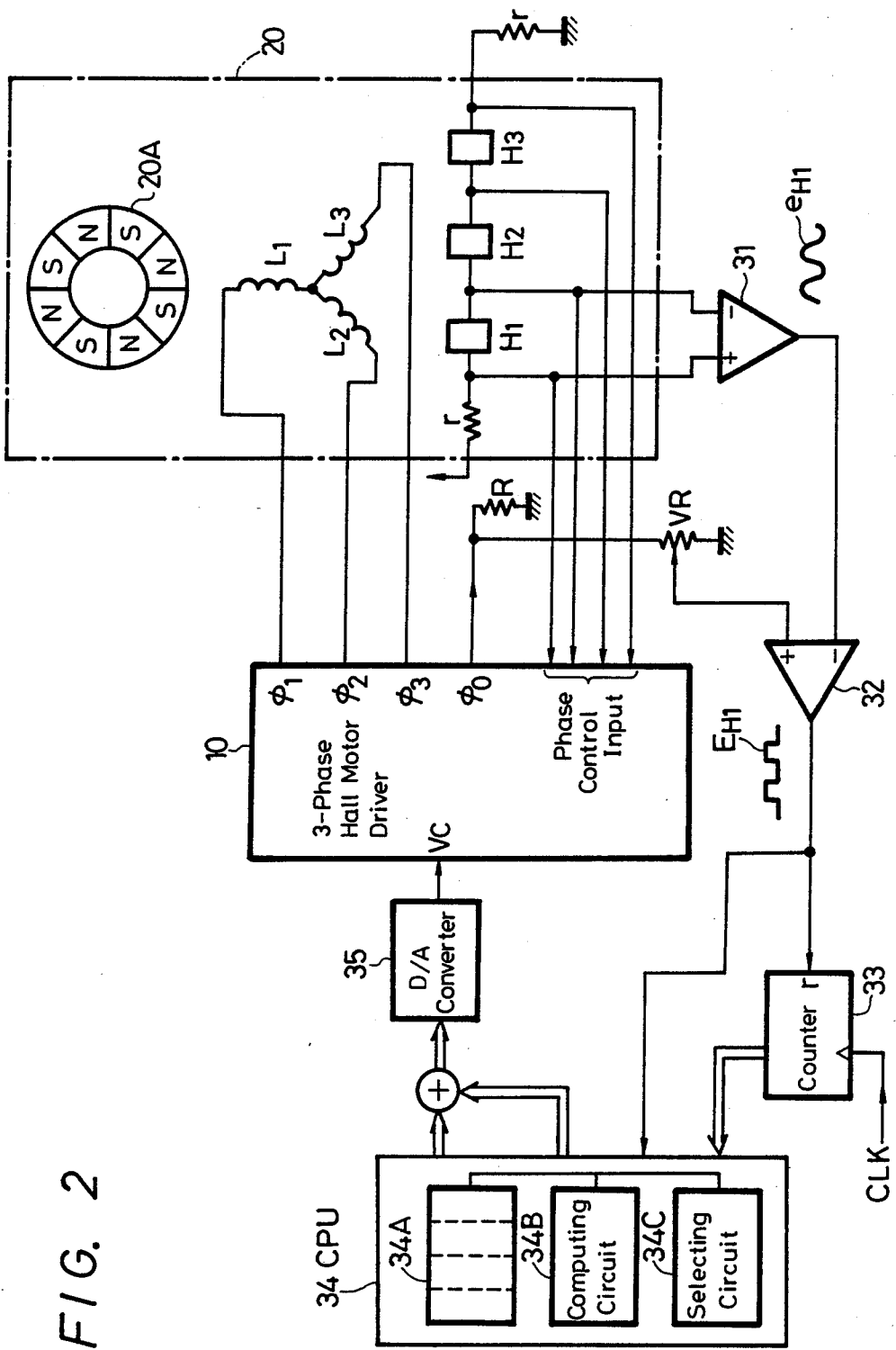
FIG. 2 is a block diagram of a rotation control circuit for a Hall motor according to an embodiment of the present invention.

FIG. 2 is a schematic in block diagram form of a rotation control circuit for a Hall motor according to the present invention.

There are provided a Hall motor integrated circuit (IC) driver 10 and a portion 20 of a Hall motor which is shown by a one-dot chain line block in FIG. 2.

As earlier noted, the Hall motor is comprised of a rotor magnet 20A, three sets of stator coils $L_1$, $L_2$, $L_3$ and three Hall elements $H_1$, $H_2$, $H_3$. Magnetic field detecting signals induced in the respective Hall elements $H_1$, $H_2$ and $H_3$ for detecting the magnetic field of the rotor magnet 20A are supplied to the drive IC circuit 10. It produces and supplies three phase alternate currents $\phi_1$, $\phi_2$ and $\phi_3$, adjusted to have predetermined phases on the basis of the magnetic field detecting signals, to the three sets of stator coils $L_1$, $L_2$ and $L_3$, respectively. There is provided a common terminal $\Phi_0$ for the three-phase alternate currents, and which becomes zero in voltage level when the phase difference of currents flowing through the three sets of stator coils $L_1$, $L_2$ and $L_3$ is 120 degrees and when they are substantially the same in current level.

A differential amplifier 31 detects the rotor magnet rotation information derived from one Hall elements ($H_1$). A quasi-sine wave signal derived from the differential amplifier 31 is supplied to one input terminal of a comparator 32.

The sine wave signal is converted to a square wave signal of transistor-transistor-logic (TTL) level by the comparator 32 and is supplied to a reset terminal r of a counter 33 and to a central processing unit (CPU) 34.

The counter 33 is supplied from an external source with a clock signal CLK having a predetermined frequency (500 kHz). The counter 33 counts the clock signal CLK in response, for example, to the leading edge of the output from the comparator 32, and the count value of the counter 33 is supplied to the CPU 34 in response to the timing at which the comparator 32 generates the signal.

The CPU 34 is comprised of, if eight north (N) and south (S) poles are magnetized on the rotor magnet 20A, at least four memory circuits 34A, a computing circuit 34B and a selecting circuit 34C. Irregular magnetization information concerning the rotor magnet 20A is detected from the count value of the counter 33 and the detected information is stored in the four memory circuits 34A.

In the normal recording and/or reproducing mode, the irregular magnetization information stored in the memory circuits 34A is sequentially supplied to a digital-to-analog (D/A) converter 35 at a predetermined timing and the output therefrom is then fed to the IC circuit 10, which drives the Hall motor, thus controlling the level of a voltage (Vc) derived from a circuit which generates the drive voltages supplied to the stator coils $L_1$, $L_2$ and $L_3$.

Figure 3:
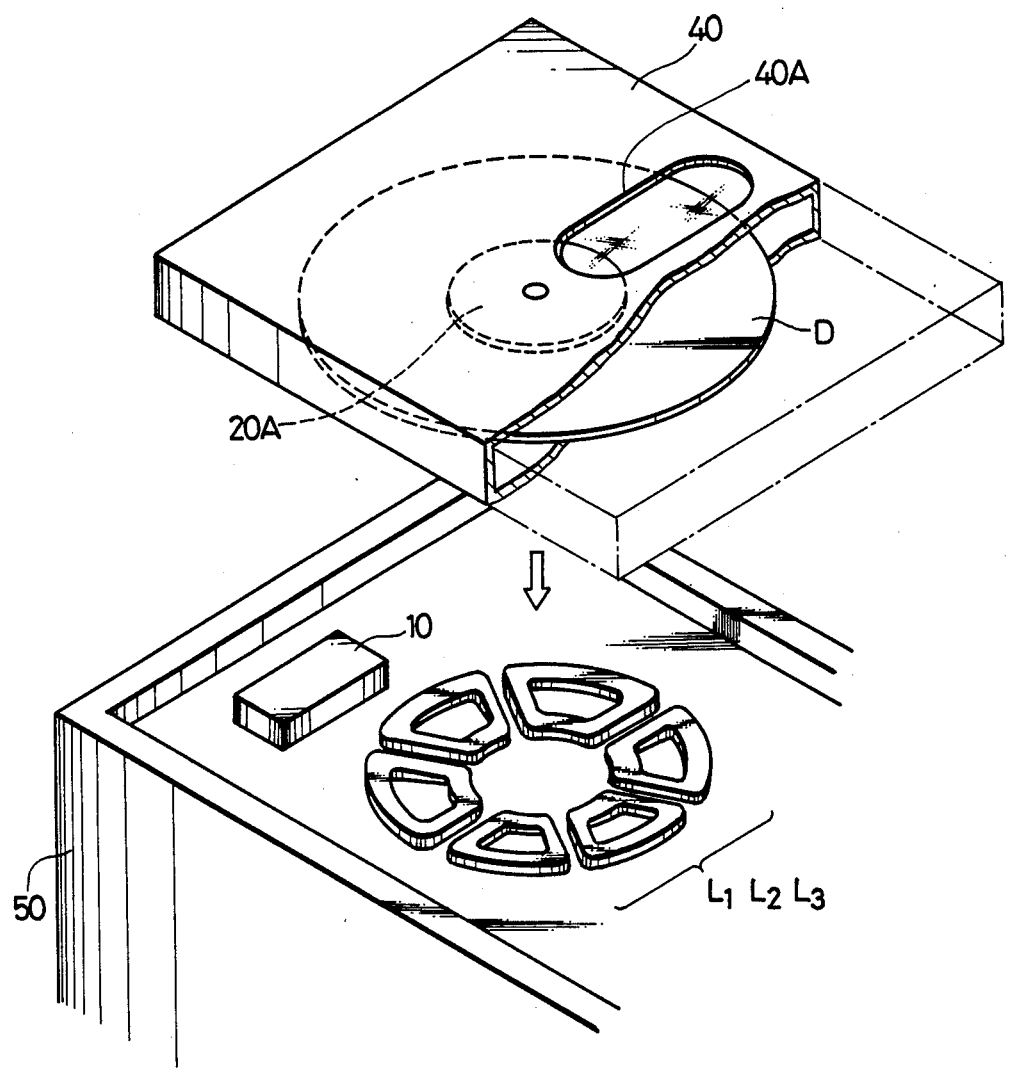
FIG. 3 is a schematic perspective view of a Hall motor according to an embodiment of the present invention.

FIG. 3 is a pictorial perspective view of an arrangement of a rotation mechanism which utilizes a Hall motor to rotate an optical disk according to an embodiment of the present invention.

In FIG. 3, reference numeral 40 designates a compact disk casing in which an optical disk D is rotatably supported by some suitable means such as a pivot bearing or the like. An opening window 40A is formed through one portion of the compact disk casing 40 at its top surface or at its under surface, through which a laser beam impinges on the optical disk D.

The rotor magnet 20A on which eight north (N) and south (S) poles are magnetized is fixedly located on the under surface of the optical disk D at its center. The rotor magnet 20A is opposed, when the compact disk casing 40 is loaded on to an optical disk apparatus 50 from the lateral direction or from the upward direction, to stator coils $L_1$, $L_2$ and $L_3$ provided on the optical disk apparatus 50 through the bottom wall of the compact disk casing 40.

When the three-phase alternate current signals $\Phi_1$, $\Phi_2$ and $\Phi_3$ of predetermined phases are supplied to the stator coils $L_1$, $L_2$ and $L_3$ from the motor drive circuit 10 provided in the optical disk apparatus 50, the optical disk D within the compact disk casing 40 loaded onto the optical disk apparatus 50 rotates at a predetermined revolution rate, and a laser beam emitted from an optical head (not shown) impinges on the optical disk D through the opening window 40A, thereby reading recorded information from the optical disk D or writing information on the optical disk D.

The operation for controlling the Hall motor according to the present invention will be explained hereinbelow.

When the optical disk D is loaded onto the optical disk apparatus 50 as shown in FIG. 3, a system controller (not shown) controls the Hall motor drive IC circuit 10 so as to supply the stator coils $L_1$, $L_2$ and $L_3$ with the three-phase drive signals, whereby the rotation magnetic fields of the stator coils $L_1$, $L_2$, $L_3$ cause the rotor magnet 20A secured to the central under surface of the optical disk D to begin to rotate.

Figure 1:
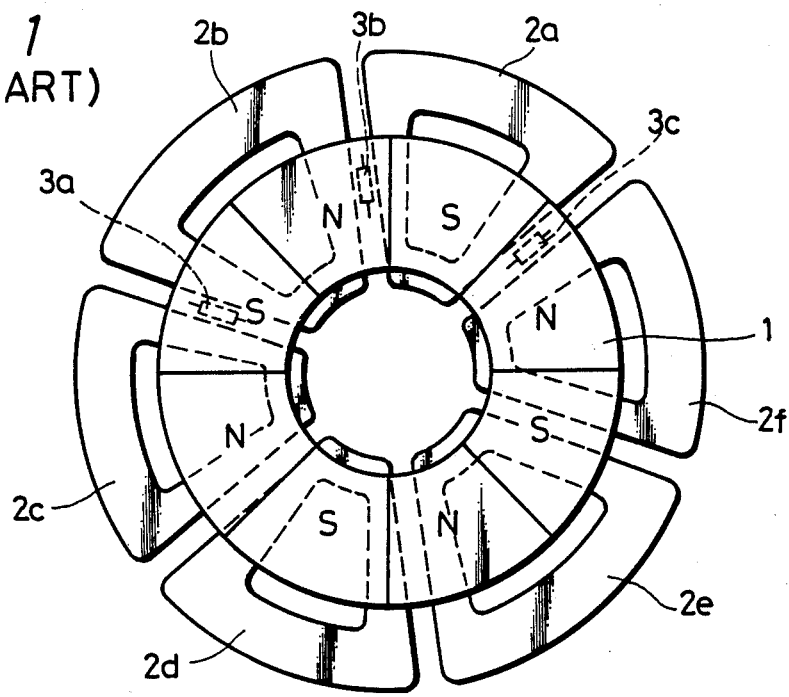
FIG. 1 is a schematic plan view of a standard Hall motor, and to which reference will be made in explaining the operating principles thereof.
Figure 4:
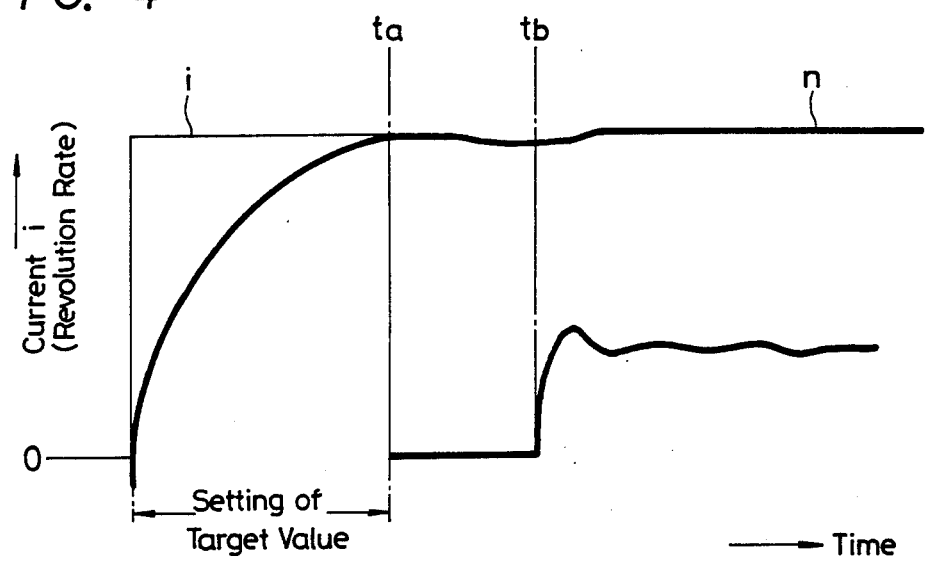
FIG. 4 is a waveform diagram to which reference will be made in explaining detection of irregular rotation information.
Figure 5:
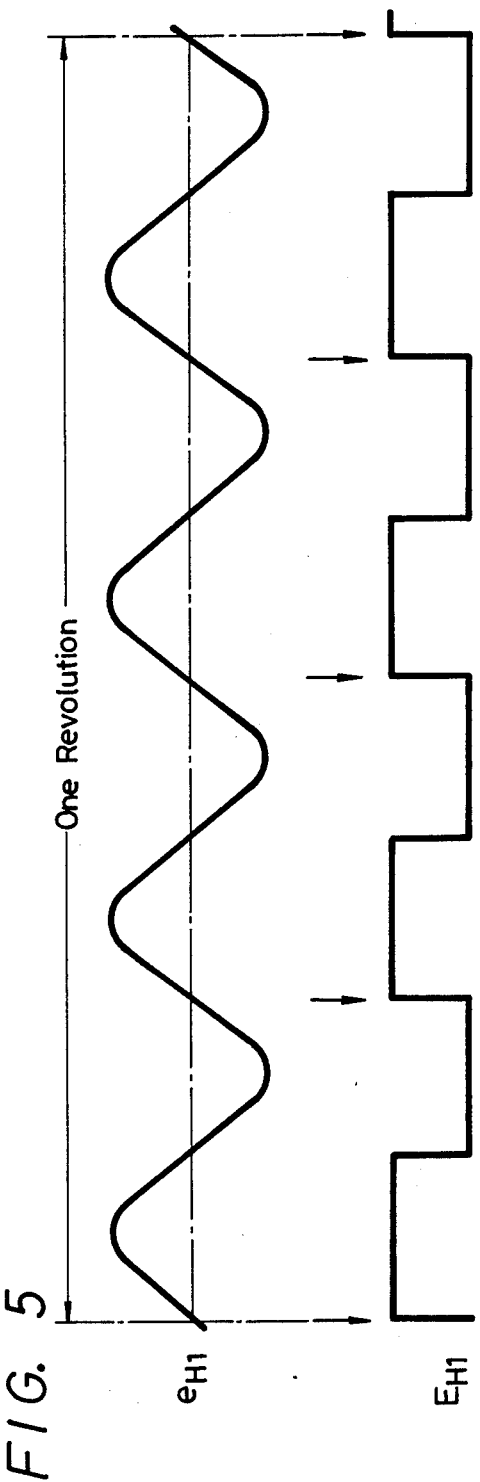
FIG. 5 is a waveform diagram to which reference will be made in explaining the relationship between the change of magnetic field of the rotor magnet and the calculated value.

When the rotor magnet 20A begins to rotate, the level of the drive current i is increased rapidly as shown in FIG. 4. When the revolution rate n of the rotor magnet 20A is increased, the period of the cycle of the alternate current signal derived from the Hall element $H_1$ is reduced, and the count value of the counter 33, reset in this cycle, is decreased. As will be described later, the frequency of the clock signal CLK is chosen such that when the count values ($N_1$, $N_2$, $N_3$, $N_4$) of the counter 33 are monitored and the count value reaches a predetermined value, the optical disk D rotates at a predetermined revolution rate, for example, 1800 r.p.m. When the optical disk D begins to rotate at the predetermined revolution rate, the supply of the drive current i is temporarily interrupted at a time point ta, and the optical disk D rotates by inertia force from the time point ta. As shown in FIG. 5, a differential induced voltage $e_{H1}$, from the Hall element $H_1$ during one revolution of the optical disk D, is generated from the differential amplifier 31 and fed to the comparator 32, in which it is converted to a square wave signal $E_{H1}$.

The comparator 32 generates, when eight north (N) and south (S) poles are magnetized on the rotor magnet 20A, four square wave signals $E_{H1}$ (whose waveform is shown in FIG. 5) per revolution of the optical disk D. When the count value of the counter 33, which counts the clock signal CLK, is reset at the leading edge of the square wave signal $E_{H1}$, four count values $N_1$, $N_2$, $N_3$ and $N_4$ are supplied to the CPU 34 from the time point ta per revolution.

As will be explained in greater detail further herein, the count values $N_1$, $N_2$, $N_3$ and $N_4$ are stored in the memory circuits 34A as detected values indicating irregular magnetization of the rotor magnet 20A attached to the optical disk D.

Then, the computing circuit 34B adds the count values $N_1$, $N_2$, $N_3$ and $N_4$ and divides the resultant added value by 4, and computes an average count value $N_{AV}=(N_1+N_2+N_3+N_4)/4$. In the next step, the computing circuit 34B computes differences between the count values $N_1$, $N_2$, $N_3$, $N_4$ and the average count value $N_{Av}$ to provide difference count values $\Delta N_1=N_{Av}-N_1$, $\Delta N_2=N_{Av}-N_2$, $\Delta N_3=N_{AV}-N_3$ and $\Delta N_4=N_{AV}-N_4$. These difference count values $\Delta N_1$, $\Delta N_2$, $\Delta N_3$, and $\Delta N_4$ are again stored in the memory circuits 34A in the predetermined order. These difference count values $\Delta N_1$, $\Delta N_2$, $\Delta N_3$, and $\Delta N_4$ demonstrate the conditions that eight magnets are irregularly magnetized on the rotor magnet 20A.

When the drive current i is again supplied to the stator coils $L_1$, $L_2$ and $L_3$ after the above-noted computation is ended at a time point tb shown in FIG. 4, if values $N_1$, $N_2$, $N_3$ and $N_4$ (present revolution rates), which are newly measured in synchrony with the rotation of the optical disk D to indicate the revolution rate of the optical disk D at that time point and the drive currents i corresponding to the difference count values $\Delta N_1$, $\Delta N_2$, $\Delta N_3$, and $\Delta N_4$ are supplied together to the stator coils $L_1$, $L_2$, $L_3$ and $L_4$ in synchrony with the rotational phase of the optical disk D, then the drive current i will be supplied to the stator coils $L_1$, $L_2$, $L_3$ and $L_4$ from the time point tb so that the optical disk D can rotate at 1800 r.p.m and that the irregular rotation of the optical disk D can be avoided.

In other words, even when optical disks D with different rotor magnets 20A for respective cassette casings 40 are loaded on to the optical disk apparatus 50, a drive current can be supplied to the motor drive IC circuit 10 so that each optical disk D rotates in a minimal irregular rotation condition.

When the level of the drive current i is changed by the irregular rotation information signal stored in the CPU 34 in response to the rotational phase of the optical disk D, it is frequently observed that the level of the detection signal from the Hall element $H_1$ is slightly fluctuated by the influence of the magnetic fields of the stator coils $L_1$, $L_2$, $L_3$ and $L_4$. According to the embodiment of the present invention, a voltage drop, caused by currents flowing through the stator coils $L_1$, $L_2$ and $L_3$, is detected by a resistor R and the detected signal of the voltage drop is supplied through the movable contact of a potentiometer VR to a reference voltage terminal of the comparator 32 as shown in FIG. 2, thereby preventing the phase of the output derived from the comparator 32 from being affected by the currents flowing through the stator coils $L_1$, $L_2$, $L_3$ and $L_4$.

In the above-noted embodiment the sums ($N_1+\Delta N_1$, $N_2+\Delta N_2$, $N_3+\Delta N_3$ and $N_4+\Delta N_4$) of the difference count values $\Delta N_1$, $\Delta N_2$, $\Delta N_3$ and $\Delta N_4$ stored in the memory circuits 34 and the count values $N_1$, $N_2$, $N_3$ and $N_4$ (present revolution rates) newly measured in synchrony with the rotation of the optical disk D are supplied through the D/A converter 35 to the IC circuit 10 as information, which reduces the irregular rotation of the Hall motor to thereby effect the rotation speed servo and to control the level of the drive current i in response to the rotary phase as described above. In another embodiment the count values $N_1$, $N_2$, $N_3$ and $N_4$ of the counter 33 are directly stored in the memory circuits 34A as servo information of the irregular rotation of the Hall motor, and the level of the drive current i is controlled on the basis of the data thus stored in the memory circuits 34A.

The irregular rotation information signal for the optical disk D accommodated within the compact disk casing 40 is supplied to the CPU 34 for at least one revolution (or two revolutions) from the time point ta at which the supply of the drive current i is interrupted. In this case, the rotation speed of the optical disk D. which is rotated by inertia force because of the interruption of the drive current i, is slightly lowered. This will be explained more fully with reference to FIG. 6.

Figure 6:
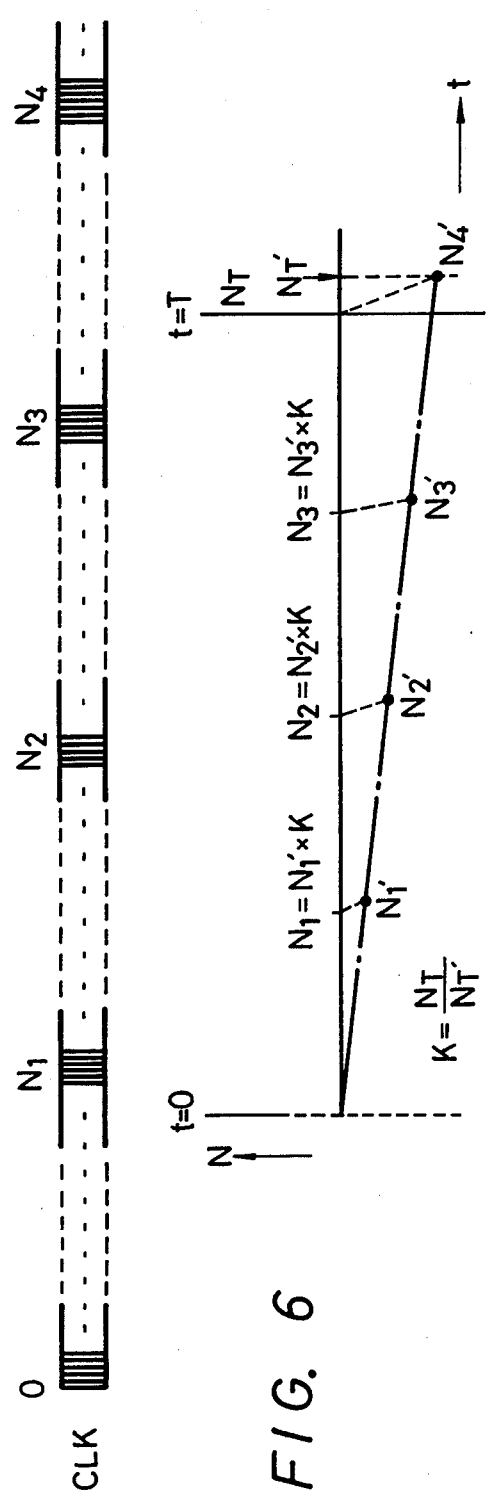
FIG. 6 is a schematic representation to which reference will be made in explaining how to correct the calculated values.

Referring to FIG. 6, the counter 33 produces count values $N_1$, $N_2$, $N_3$ and $N_4$ when the revolution rate is not lowered in the first one revolution t=T. When the optical disk D is rotated by the force of inertia, the rotation speed is lowered during one revolution so that the counter 33 produces count values $N_1'$, $N_2'$, $N_3'$ and $N_4'$. Accordingly, the count values $N_1'$, $N_2'$, $N_3'$ and $N_4'$ are multiplied with $K=N_T/N_T'$ (where $N_T$ represents the count value calculated per revolution of the correct revolution rate of 1800 r.p.m.) to thereby compute count values in the correct revolution rate (1800 r.p.m.) when the supply values are preferably fed to the CPU 34.

While the rotor magnet 20A secured to the optical disk D is driven in the above-noted embodiment, it is needless to say that, if the rotation control circuit of the present invention is applied to the BSL motor mechanism in which the rotor magnet is secured to the rotary shaft like the standard Hall motor, then the rotor magnet can be driven to rotate without irregular torque.

Furthermore, while the magnetic field of the rotor magnet is detected by the Hall element in the above-noted embodiment, the Hall element can be replaced with another type of magnetic field sensitive element so long as the magnetic field sensitive element operates similarly to a Hall element.

Having described a preferred embodiment of the present invention in detail with reference to the accompanying drawings, it is to be understood that the invention is not limited to that precise embodiment and that many changes and modifications could thereby by effected by one skilled in the art without departing from the spirits and scope of the invention defined in the appended claims.

I claim as my invention:

1. A rotation control circuit for a Hall motor of the type having a rotor magnet having a plurality of magnetic poles, a plurality of stator coils, and a Hall element which is positioned for detecting changes of the magnetic field of the rotor magnet which is rotated in an opposing relation to the plurality of stator coils and outputs a signal, wherein the control circuit comprises:

(a) a motor drive circuit for supplying a drive current to the plurality of stator coils;

(b) comparing means for comparing the signal detected by the Hall element with a predetermined reference level;

(d) counter means for receiving and counting a reference clock signal from an external source and which is reset in response to an output from the comparing means;

(e) computing means supplied with the count of the counter for computing irregular rotation data information on the basis of the count value corresponding to at least one revolution of the rotor magnet;

(f) memory means for storing the irregular rotation data information obtained by the computing means; and (g) control means for supplying the irregular rotation data stored in the memory means to the motor drive circuit in synchronism with the rotational phase of the rotor magnet, wherein the drive current supplied from the motor drive circuit to the plurality of stator coils is controlled by the irregular rotation information signal sequentially derived from the control circuit to thereby reduce irregular rotation of the rotor magnet.

2. A rotation control circuit for a Hall motor according to claim 1, further comprising means for sensing the current flowing through the stator coils and, in response thereto, generating a reference signal of the predetermined level and supplying it to the comparing means.

3. A rotation control circuit for a Hall motor according to claim 1, wherein the number of magnetic rotor poles is 2n (where n is a natural number), the computing means computes an average count value $N_{Av}$ $(N_1+N_2+N_3+\ldots+N_n)/n$ from respective count values $N_1, N_2, N_3, \ldots, N_n$ of at least one revolution of the rotor magnet and computes difference count values $\Delta N_1 = N_{Av} - N_1$, $\Delta N_2 = N_{Av} - N_2$, $\Delta N_3 = N_{Av} - N_3$, $\ldots$, $\Delta N_n = N_{Av} - N_n$, as the irregular rotation information signals.

4. A rotation control circuit for a Hall motor according to claim 1, in which when 2n poles (n is a natural number) are magnetized on the rotor magnet, the memory means stores at least n irregular rotation information signals.

5. A rotation control circuit for a Hall motor according to claim 1, further comprising control means for supplying the count value of at least one revolution of the rotor magnet obtained by the counter means and means, including a digital-to-analog (D/A) converter, for supplying the irregular rotation data stored in the memory means to the motor drive circuit in synchrony with the rotary phase of the rotor magnet.

* * * * *